No. 803,061. PATENTED OCT. 31, 1905.
E. F. B. KENYON.
APPLIANCE FOR REDUCING BREAD TO CRUMBS.
APPLICATION FILED OCT. 7, 1904.

Witnesses:
Stephen Smith
Mr. Max Duvall.

Inventor.
E. F. B. Kenyon
By Wilkinson Fisher
his Attorneys.

UNITED STATES PATENT OFFICE.

EDMUND FRANCIS BEDFORD KENYON, OF HOVE, ENGLAND, ASSIGNOR OF FORTY ONE-HUNDREDTHS TO SAMUEL STOCKHAM TITT, OF BRIGHTON, ENGLAND.

APPLIANCE FOR REDUCING BREAD TO CRUMBS.

No. 803,061.  Specification of Letters Patent.  Patented Oct. 31, 1905.

Application filed October 7, 1904. Serial No. 227,585.

*To all whom it may concern:*

Be it known that I, EDMUND FRANCIS BEDFORD KENYON, a subject of the King of Great Britain, residing at Hove, in the county of Sussex, England, have invented certain new and useful Improvements in Appliances for Reducing Bread to Crumbs; and I do hereby declare the following to be a full, clear, and exact description of the invention, such as will enable others skilled in the art to which it appertains to make and use the same.

My invention relates to an appliance for reducing bread to crumbs capable of continuous working as long as the necessary bread is fed in, which works under a rotary grater of special construction which reduces the bread to crumbs, and these when sufficiently reduced fall through a perforated bottom into a receptacle placed to receive them.

My invention further relates to details in the construction of parts which assist in the carrying out of the objects of my invention.

Having set out the general construction of my invention, I will now proceed to describe a working arrangement of the same with aid of the accompanying drawings.

Figure 1:
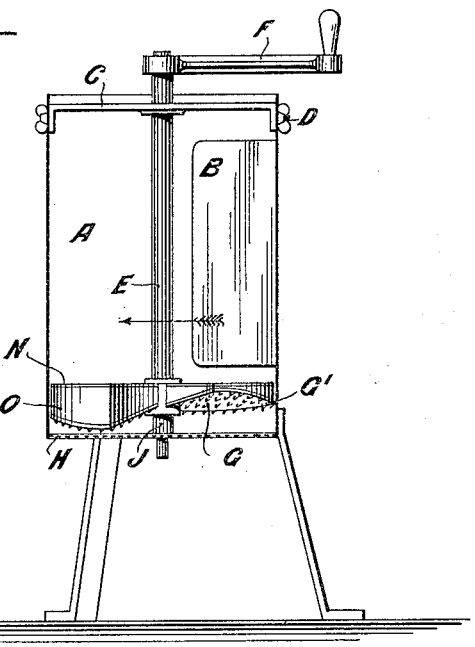
Figure 2:
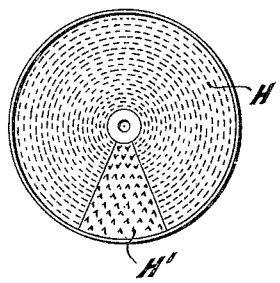
Figure 3:
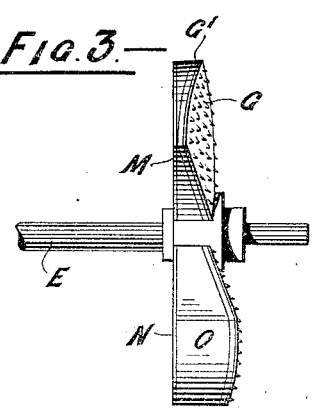
Figure 4:
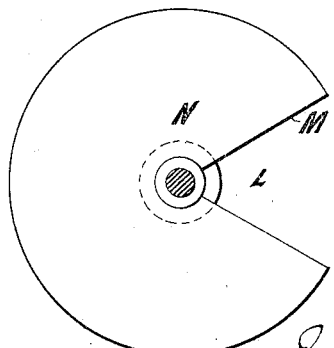

Figure 1 is a sectional elevation of a complete appliance according to my invention; Fig. 2, a detached plan view of perforated bottom; Fig. 3, a detached detail side elevational view of the revolving grater; Fig. 4, a detached plan view of the top of grater.

The appliance consists of a cylindrical case A, of stout tin-plate, with an inner fixed wing B. Across the top of case is a cross-strut, C, secured by thumb-screws D to enable it to be easily removed and replaced. This strut supports the vertical spindle E, the outside end of which is fitted with a crank-handle F to enable the spindle to be revolved by hand. The bottom end of the spindle is secured in any suitable way to a circular grater G, held just off the bottom H by a collar J. The bottom end of spindle passes through a central eye in the bottom to retain the grater central while being revolved, the pressure on the handle F holding the grater in said eye and against collar J. This bottom H is formed of strong tin-plate or zinc-plate with perforations of the size of the bread-crumbs desired to be obtained. A portion of this plate may be formed as a fixed grater by having a piece cut out and a rough piece H' let in and secured in any suitable way. I find this insertion of a grater-piece of metal in the bottom accelerates the speed of the crumbing; but the machine will work satisfactorily without such insertion.

The revolving grater part G can be formed of stabbed tin-plate secured to a foundation-plate G' of stiff metal. The grater and its connections have a notch cut out at L to allow the bread above it to feed under the grater, and to assist such feed the grater on one side of the notch is raised, as at M, and gradually inclined down to the horizontal, forming, in effect, a warped surface, the top being made level by plate N, secured to plate M by tapering rim O. The wing B prevents the fed-in bread from being carried round by the revolving of the grater, which is to be revolved in the direction shown by the arrow.

An appliance made as above described is capable of continuous work, as pieces of bread, preferably free of crust, can be continuously fed in at the top, which bread as it works under grater will be reduced to crumbs by the revolving of the grater, and so pass through the perforated bottom and fall into the receptacle placed to receive them.

I would observe that I am aware that it has been proposed to construct appliances for reducing bread to crumbs by a rotary grater working within a case; but such appliances have been so formed that a continuous feed of bread to the grater is not possible and that the grater only acts upon a predetermined quantity of bread placed under the grater, which when such quantity of bread has been reduced to crumbs the grater has to be raised or removed to enable a fresh supply of bread to be placed underneath. These obvious disadvantages are entirely overcome by the special construction of a crumber according to my invention as above set forth.

Having now particularly described my invention, what I desire to secure by Letters Patent of the United States is—

1. The combination with a suitable casing, of a circular grater adapted to fit therein having a substantially level upper surface, a warped roughened under surface and provided with an opening through both of said surfaces for feeding the material to be treated from one to the other, and means for rotating said grater, substantially as described.

2. The combination with a suitable casing, of a circular grater adapted to fit therein having a radially-arranged opening cut therethrough, a substantially level upper surface for said grater and a warped, roughened under surface, the thickness between said surfaces being greatest at one side of said opening and least at the other side, and means for rotating said grater, substantially as described.

EDMUND FRANCIS BEDFORD KENYON.

Witnesses:
FREDERIC PRINCE,
JOHN STAREY.